(12) United States Patent
Takada et al.

(10) Patent No.: US 7,354,321 B2
(45) Date of Patent: Apr. 8, 2008

(54) OUTBOARD MOTOR CONTROL SYSTEM

(75) Inventors: Hideaki Takada, Wako (JP); Naoki Hiroshima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/402,117

(22) Filed: Apr. 11, 2006

(65) Prior Publication Data
US 2007/0178779 A1  Aug. 2, 2007

(30) Foreign Application Priority Data
Apr. 12, 2005  (JP)  ............................. 2005-114863

(51) Int. Cl.
*B63H 21/21*  (2006.01)
(52) U.S. Cl. ...................... 440/1; 114/144 RE; 701/21
(58) Field of Classification Search ......... 114/144 RE, 114/144 E; 440/1; 701/21
See application file for complete search history.

(56) References Cited
U.S. PATENT DOCUMENTS 4,975,709 A * 12/1990 Koike ........................ 342/417
5,632,217 A * 5/1997 Ford et al. .................. 114/150
2003/0089291 A1 * 5/2003 Kanno et al . ............ 114/144 A
2004/0065300 A1   4/2004 Watabe et al.
2004/0181322 A1 * 9/2004 Okuyama ..................... 701/21

FOREIGN PATENT DOCUMENTS

JP   2001-304909   10/2001
JP   2004-124816   4/2004

* cited by examiner

*Primary Examiner*—Sherman Basinger
(74) *Attorney, Agent, or Firm*—Carrier, Blackman and Associates, P.C.; Joseph P. Carrier; William D. Blackman (57) ABSTRACT

In an outboard motor control system, an electronic control unit executes ordinary navigation in which the operation of at least one among a steering motor, throttle motor and shift motor is controlled in accordance with an operator command inputted from the steering wheel or shift/throttle lever (steering command, shift position change command or engine speed regulation command of the outboard motor) and executes autopilot navigation in which the boat is automatically navigated by controlling the operation of the individual electric motors based on boat position information inputted from a GPS plotter and the desired position of the boat. This simplifies the configuration for conducting both manual navigation and automatic navigation and avoids making the system larger or more complicated to install, while including boat speed regulation and stopping capability among the autopilot features.

6 Claims, 6 Drawing Sheets

OUTBOARD MOTOR CONTROL SYSTEM

BACKGROUND OF THE INVENTION

1. Field of the Invention

This invention relates to an outboard motor control system.

2. Description of the Related Art

Japanese Laid-Open Patent Application No. 2004-124816 (particularly paragraphs 0020 and 0021) teaches an outboard motor control system that uses actuators to perform outboard motor steering, engine speed regulation and shifting. The system is equipped with a steering actuator for steering the outboard motor by driving its steering shaft, a throttle actuator for regulating the speed of the internal combustion engine mounted in the outboard motor by opening/closing the throttle valve of the engine, a shift actuator for changing the shift position by driving the shift mechanism of the outboard motor, operation units (steering wheel and shift/throttle lever) manipulated by the operator for inputting at least one operator command among an outboard motor steering command, an engine speed regulation command and a shift position change command, and a control unit for controlling the operation of the actuators in accordance with the operator commands inputted through the operation units.

Japanese Laid-Open Patent Application No. 2001-304909 (particularly paragraphs 0003 etc.) teaches an autopilot system that acquires information on the position of the boat during navigation and automatically navigates the boat to eliminate deviation between the position according to the acquired information and a preset desired course position.

Conventionally, autopilot systems for a boat powered by the outboard motor are installed separately of the outboard motor. For example, the conventional autopilot system is equipped with an actuator for steering the outboard motor, a global positioning system (GPS) for acquiring boat position information, and a control unit for controlling the operation of the actuator in accordance with the output of the GPS, and these components are installed independently of the control unit and actuators of the outboard motor.

Specifically, in the prior art, the control unit required for autopilot navigation and the object to be controlled, i.e., the actuator are provided separately of those of the outboard motor, i.e., the control unit required for steering by the operator and the object to be controlled. As a result, the overall control system of the outboard motor lacks simplicity of configuration and tends to be large in size and complicated to install. In addition, conventional autopilot systems offer only outboard motor steering capability, i.e., their autopilot features do not extend to boat speed regulation or stopping, which is inconvenient.

SUMMARY OF THE INVENTION

An object of this invention is therefore to overcome the foregoing drawbacks by providing an outboard motor control system that simplifies the configuration for conducting both manual navigation and automatic navigation, avoids making the system larger or more complicated to install, and includes boat speed regulation and stopping capability among the autopilot features.

In order to achieve the object, this invention provides a system for controlling operation of an outboard motor mounted on a stem of a boat and having an internal combustion engine, comprising: a steering actuator for steering the outboard motor to right and left directions relative to the boat; a throttle actuator for moving a throttle valve of the engine to regulate an engine speed; a shift actuator for driving a shift mechanism to change a shift position of the outboard motor; an operation unit for allowing an operator to input at least one from among steering command to steering the outboard motor, engine speed regulation command to regulate the engine speed and shift position change command to change the shift position of the outboard motor, a device for detecting an actual position of the boat on a traveling course and for allowing the operator to input a desired course position; and a controller executing an autopilot navigation by controlling operation of at least one of the steering actuator, the throttle actuator and the shift actuator based on the detected actual position of the boat and the inputted desired course position, such that the boat is automatically navigated.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

An outboard motor control system according to an embodiment of the present invention will now be explained with reference to the attached drawings.

Figure 1:
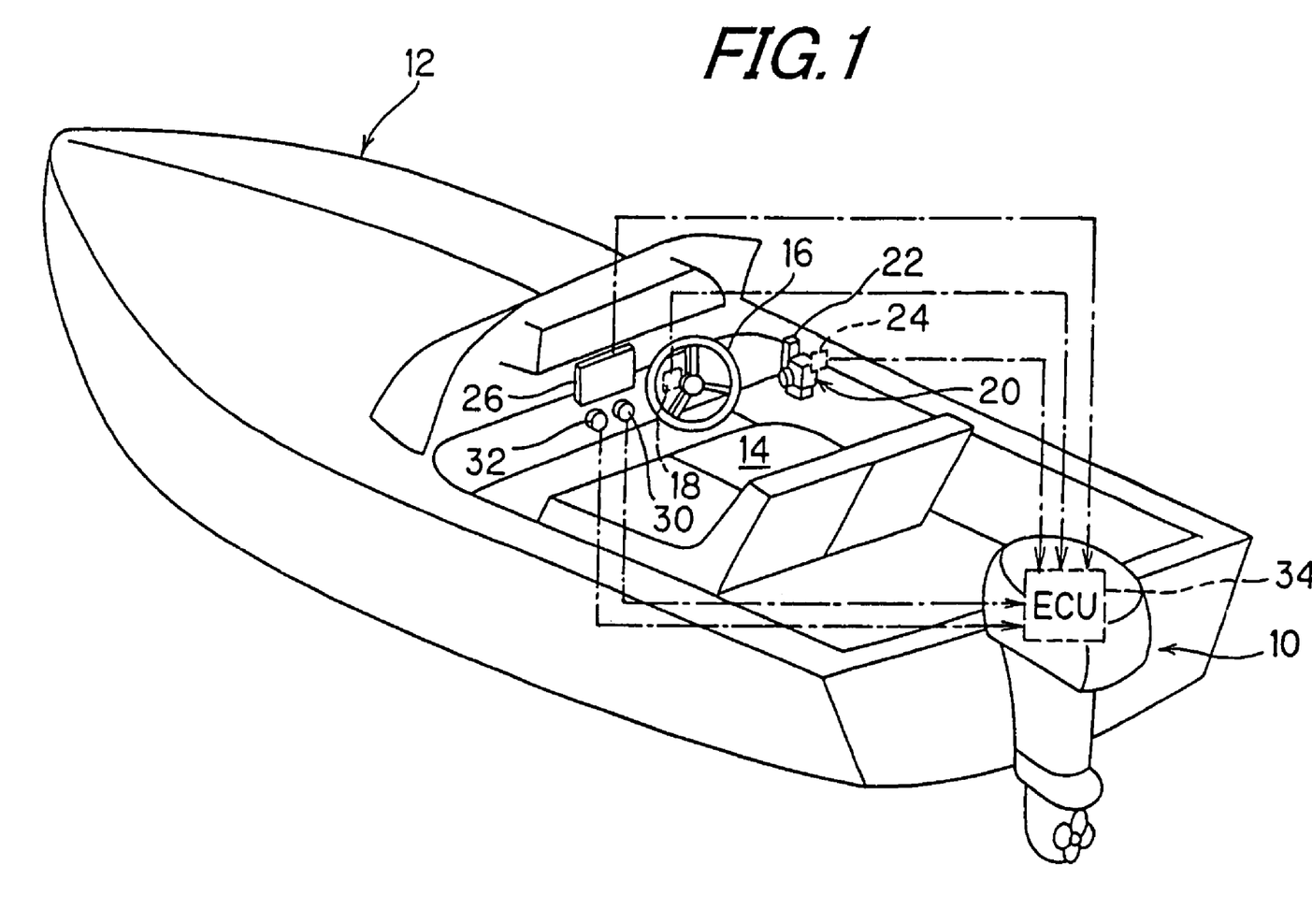
FIG. 1 is an overall schematic view of an outboard motor control system, including a boat (hull), according to an embodiment of the invention.
Figure 2:
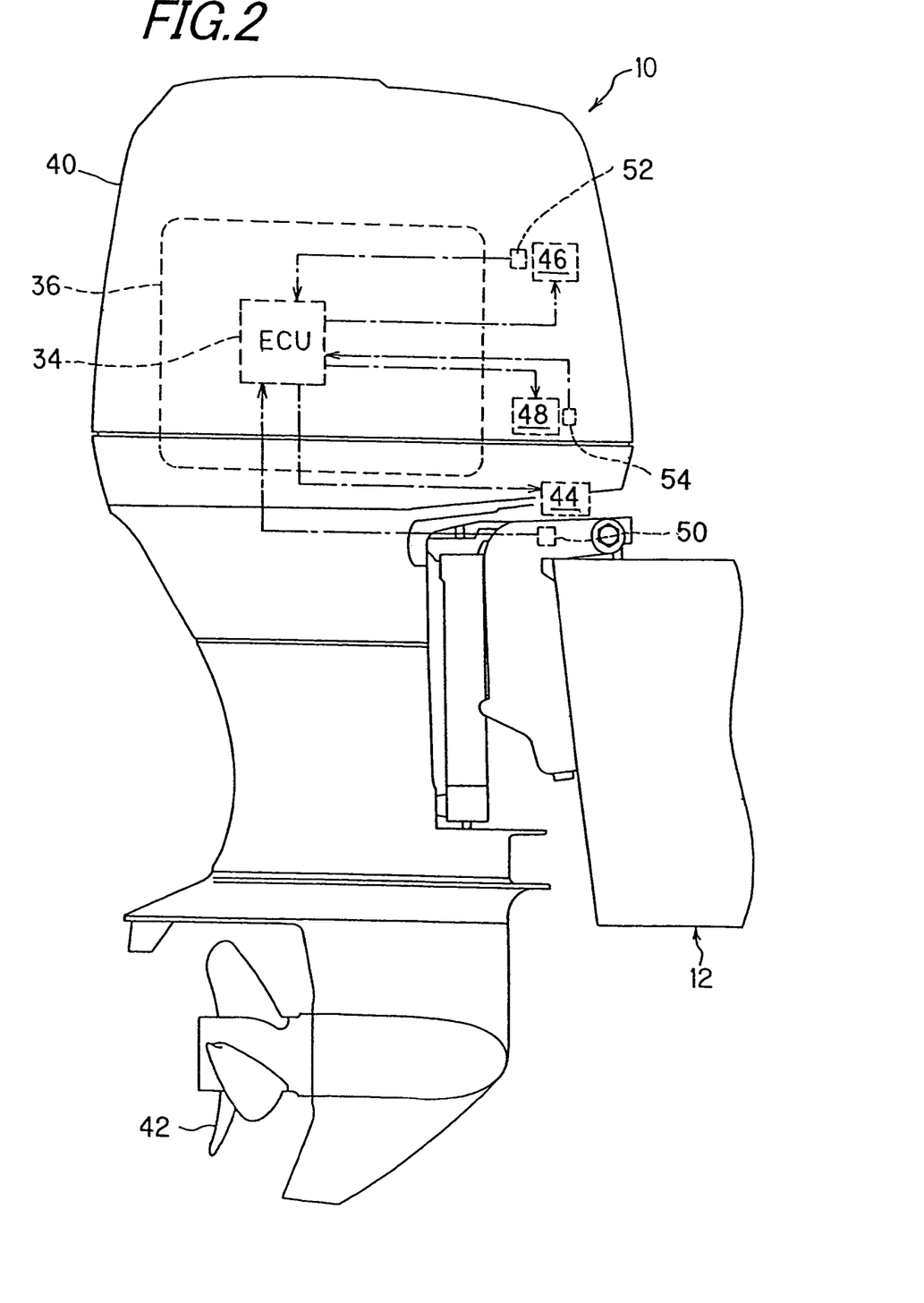
FIG. 2 is an enlarged side view of the outboard motor shown in FIG. 1.

FIG. 1 is an overall schematic view of an outboard motor control system, including a boat (hull), according to the embodiment of the invention and FIG. 2 is an enlarged side view of the outboard motor shown in FIG. 1.

In FIGS. 1 and 2, reference numeral 10 indicates an outboard motor. As illustrated, the outboard motor 10 is mounted on the stem or transom of a boat (hull) 12.

As shown in FIG. 1, a steering wheel (operation unit) 16 is installed near a cockpit or operator's seat 14 of the boat 12. The operator manipulates the steering wheel 16 to input steering commands (operator's instruction) to the outboard motor 10. A steering wheel angle sensor 18 is installed near a rotary shaft (not shown) of the steering wheel 16 and produces an output or signal indicative of the steering angle of the steering wheel 16 manipulated by the operator.

A remote control box 20 is installed near the cockpit 14. The remote control box 20 is provided with a shift/throttle lever (operation unit) 22 to be manipulated by the operator. The shift/throttle lever 22 can be rotated fore and aft from its initial position, and is positioned to be manipulated by the operator to input shift position change commands (operator's instruction) and engine speed regulation commands (operator's instruction). A lever position sensor 24 is also installed at the remote control box 20 and produces an output or signal corresponding to the position to which the shift/throttle lever 22 is manipulated by the operator.

A GPS (Global Positioning System) plotter 26 is installed near the cockpit 14. The GPS plotter 26 acquires information about the position or location of the boat 12 on a traveling course and is manipulated by the operator for inputting a desired course position of the boat 12. Specifically, the GPS plotter 26 comprises a receiver, a display, a plurality of switches and the other components (none of which shown) and specifies the position of the boat 12 on the traveling course by receiving radio wave transmitted from a satellite and indicates the wake of the boat 12 on the display, while being inputted with the desired course position of the boat 12 through the switches manipulated by the operator. Further, the GPS plotter 26 produces signals or outputs corresponding to the acquired position information indicative of the location of the boat 12 and the inputted desired course position.

An autopilot switch 30 and boat speed setting switch 32 are disposed near the cockpit 14. The autopilot switch 30 produces an output or signal indicative of an autopilot execute command or an autopilot disable command in response to the manipulation by the operator. The boat speed setting switch 32 produces an output or signal indicative of instructed speed (desired speed) Vo during the autopilot control operation in response to the manipulation by the operator. The foregoing outputs are sent to an electronic control unit (ECU; controller) 34 that comprises a microcomputer and is mounted on the outboard motor 10.

As shown in FIG. 2, the outboard motor 10 is equipped with an internal combustion engine (hereinafter referred to as "engine") 36 at its upper portion. The engine 36 comprises a spark-ignition gasoline engine. The engine 36 is located above the water surface and covered by an engine cover 40. The ECU 34 is installed in the engine cover 40 at a location near the engine 36. The outboard motor 10 is equipped at its lower portion with a propeller 42. The propeller 42 is rotated by power transmitted from the engine 36 via a shift mechanism (not shown in FIG. 2) and the like and produces thrust for propelling the boat 10 forward and rearward.

The outboard motor 10 is further equipped with an electric steering motor (steering actuator) 44 that drives a steering shaft (not shown in FIG. 2) of the outboard motor 10 to steer the outboard motor 10 to the right and left directions relative to the boat 12, an electric throttle motor (throttle actuator) 46 that opens and closes a throttle valve (not shown in FIG. 2) of the engine 36 and an electric shift motor (shift actuator) 48 that drives the shift mechanism to change the shift position.

A steering angle sensor 50 is disposed near the steering motor 44 and produces an output or signal in response to the steering angle of the outboard motor 10. A throttle position sensor 52 is installed near the throttle motor 46 and produces an output or signal in response to the opening of the throttle valve. A shift position sensor 54 is installed near the shift motor 48 and produces an output or signal indicative of the shift position comprising neutral, forward or reverse. The outputs of the aforesaid sensors 50, 52, 54 are sent to the ECU 34.

Figure 3:
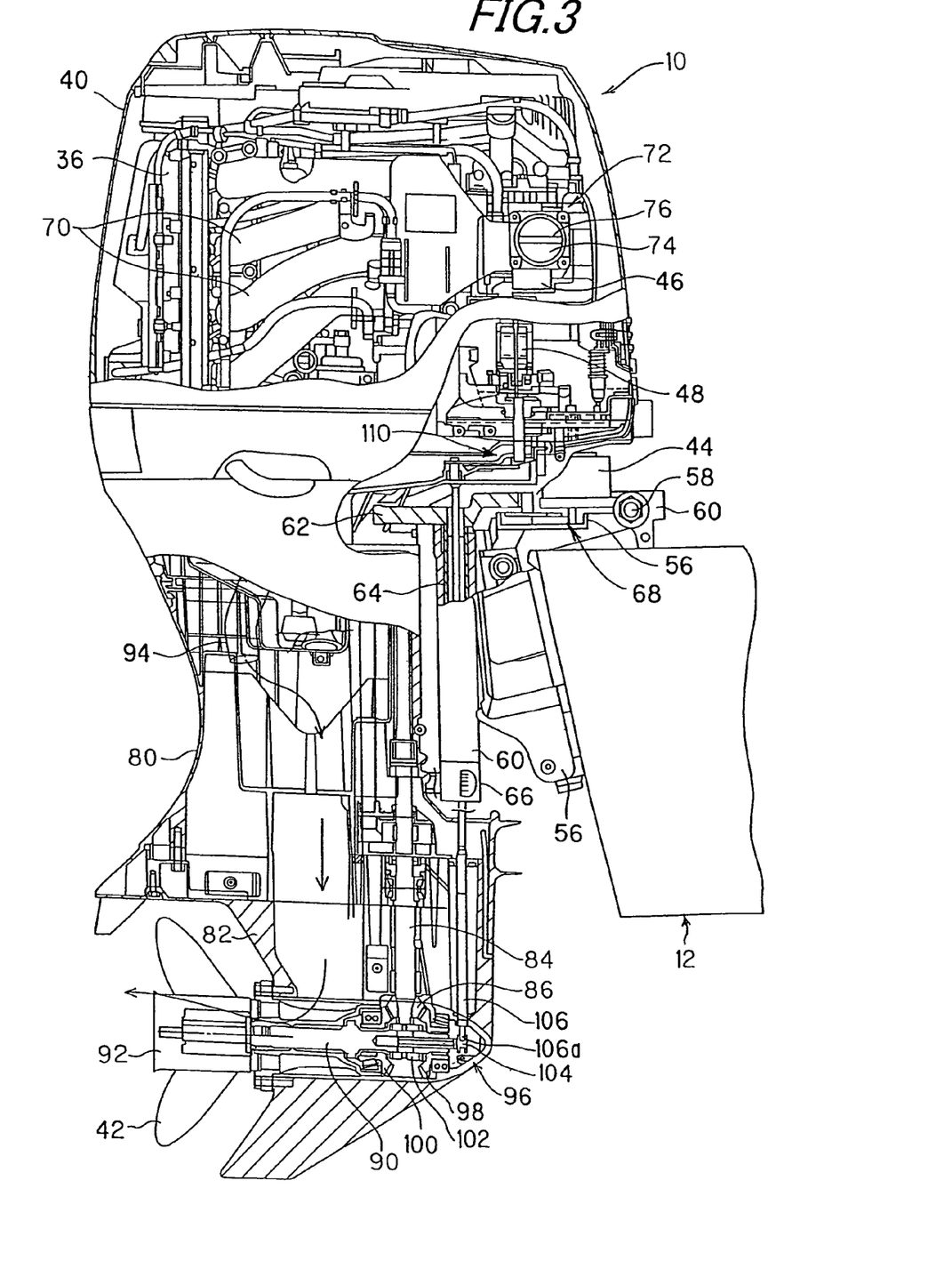
FIG. 3 is a partial sectional view of the outboard motor shown in FIG. 1.

The structure of the outboard motor 10 will be explained with reference to FIG. 3. FIG. 3 is a partial sectional view of the outboard motor 10.

The outboard motor 10 is equipped with stern brackets 56 fastened to the stern of the boat 12. A swivel case 60 is attached to the stern brackets 56 through a tilting shaft 58. The outboard motor 10 is also equipped with a mount frame 62 having a shaft (steering shaft) 64. The shaft 64 is housed in the swivel case 60 to be freely rotated about a vertical axis. The upper end of the mount frame 62 is fastened to a frame of the outboard motor 10 and the lower end thereof is fastened through a lower mount center housing 66 to the frame of the outboard motor 10.

The upper portion of the swivel case 60 is installed with the steering motor 44. The output shaft of the steering motor 44 is connected to the mount frame 62 via a speed reduction gear mechanism 68. Specifically, a rotational output generated by driving the steering motor 44 is transmitted via the speed reduction gear mechanism 68 to the mount frame 62 such that the outboard motor 10 is steered about the shaft 64 as a rotational axis to the right and left directions (i.e., steered about the vertical axis). The steering angle sensor 50 produces an output or signal in response to the rotational angle of the shaft 64 as the steering angle of the outboard motor 10.

The engine 36 has an intake pipe 70 that is connected to a throttle body 72. The throttle body 72 has a throttle valve 74 installed therein and the throttle motor 46 is integrally disposed thereto. The output shaft of the throttle motor 46 is connected via a speed reduction gear mechanism (not shown) disposed near the throttle body 72 with a throttle shaft 76 that supports the throttle valve 74. Specifically, a rotational output generated by driving the throttle motor 46 is transmitted to the throttle shaft 76 to open and close the throttle valve 74, thereby regulating the flow rate of the air sucked in the engine 36 to control the engine speed.

An extension case 80 is installed at the lower portion of the engine cover 40 covering the engine 36 and a gear case 82 is installed at the lower portion of the extension case 80. A drive shaft (vertical shaft) 84 is supported in the extension case 80 and gear case 82 to be freely rotated about the vertical axis. One end, i.e., the upper end of the drive shaft 84 is connected to a crankshaft (not shown) of the engine 36 and the other end, i.e., the lower end thereof is equipped with a pinion gear 86.

A propeller shaft 90 is supported in the gear case 82 to be freely rotated about the horizontal axis. One end of the propeller shaft 90 extends from the gear case 82 toward the rear of the outboard motor 10 and the propeller 42 is attached thereto, i.e., the one end of the propeller shaft 90, via a boss portion 92.

As indicated by the arrows in FIG. 3, the exhaust gas (combusted gas) emitted from the engine 36 is discharged from an exhaust pipe 94 into the extension case 80. The exhaust gas discharged into the extension case 80 further passes through the interior of the gear case 82 and the interior of the boss portion 92 of the propeller to be discharged into the water to the rear of the propeller 42.

The outboard motor 10 is further equipped with the shift mechanism (now assigned with symbol 96). The shift mechanism 96 comprises a forward bevel gear 98, reverse bevel gear 100, clutch 102, shift slider 104, shift rod 106 and speed reduction gear mechanism 110. The forward bevel gear 98 and reverse bevel gear 100 are disposed onto the outer periphery of the propeller shaft 90 to be rotatable in opposite directions by engagement with the pinion gear 86. The clutch 102 is installed between the forward bevel gear 98 and reverse bevel gear 100 and is rotated integrally with the propeller shaft 90.

The shift rod 106 penetrates from the upper portion to lower portion in the interior of the outboard motor 10. Specifically, the shift rod 106 is supported to be freely rotated about the vertical axis in a space from the engine cover 30, passing through the swivel case 54 (more specifically the interior of the shaft 58 accommodated therein), to the gear case 82. The clutch 102 is connected via the shift slider 104 to a rod pin 106a disposed on the bottom of the shift rod 106. The rod pin 106a is formed at a location offset from the center of the bottom of the shift rod 106 by a predetermined distance. As a result, the rotation of the shift rod 106 causes the rod pin 106a to move while describing an arcuate locus whose radius is the predetermined distance (offset amount).

The movement of the rod pin 106a is transferred through the shift slider 104 to the clutch 102 as displacement parallel to the axial direction of the propeller shaft 90. As a result, the clutch 102 is slid to a position where it engages one or the other of the forward bevel gear 98 and reverse bevel gear 100 or to a position where it engages neither of them.

When the clutch 102 is engaged with the forward bevel gear 98, the rotation of the drive shaft 84 is transmitted through the pinion gear 86 and forward bevel gear 98 to the propeller shaft 90, thereby rotating the propeller 32 to produce thrust in the direction of propelling the boat 12 forward. Thus the forward shift (gear) position is established. On the other hand, when the clutch 102 is engaged with the reverse bevel gear 100, the rotation of the drive shaft 84 is transmitted through the pinion gear 86 and reverse bevel gear 100 to the propeller shaft 90, thereby rotating the propeller 32 in the direction opposite from that during forward travel to produce thrust in the direction of propelling the boat 12 rearward. Thus the reverse shift (gear) position is established.

When the clutch 102 is moved to a position where it engages neither the forward bevel gear 98 nor the reverse bevel gear 100, the transmission of the rotation of the drive shaft 84 to the propeller shaft 90 is cut off. Thus the neutral shift (gear) position is established.

The interior of the engine cover 40 is disposed with the shift motor 48 and the output shaft thereof is connected to the upper end of the shift rod 106 through the speed reduction gear mechanism 110. Therefore, when the shift motor 48 is driven, its rotational output is transmitted to the shift rod 106 through the speed reduction gear mechanism 110, thereby rotating the shift rod 106. The rotation of the shift rod 106 drives (slides) the clutch 102 to conduct the shift (gear) change to select from among the forward, reverse and neutral shift positions. The shift position sensor 54 produces an output or signal in response to the operation amount of the shift mechanism 96, i.e., the rotational angle of the shift rod 106, as a signal indicative of the shift position.

Figure 4:
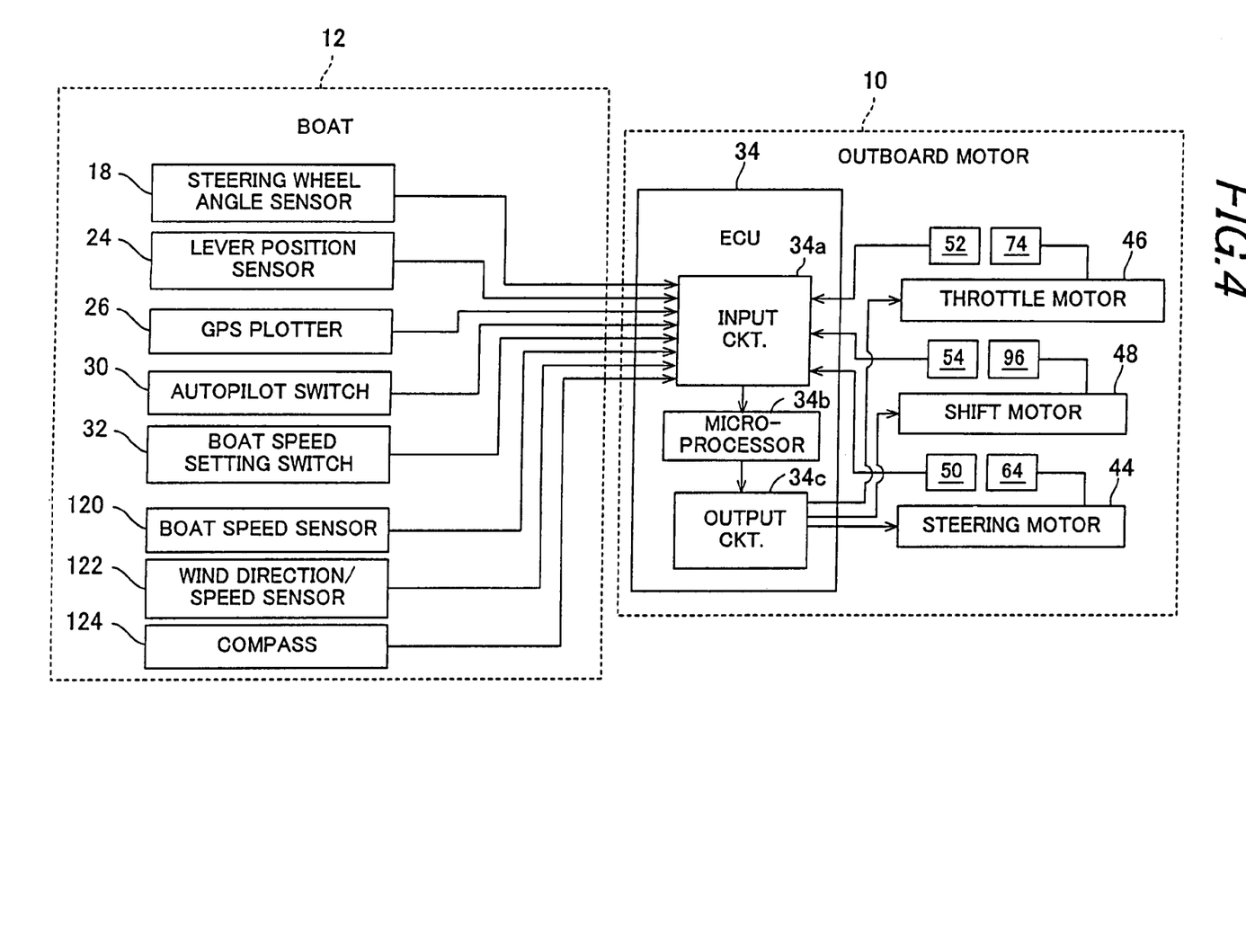
FIG. 4 is a block diagram functionally representing the system shown in FIG. 1.

FIG. 4 is block diagram functionally representing the system shown in FIG. 1.

As shown in FIG. 4, the ECU 34 incorporates an input circuit 34a, a microprocessor 34b and an output circuit 34c. The outputs of the aforesaid steering angle sensor 18, lever position sensor 24, GPS plotter 26, autopilot switch 30 and boat speed setting switch 32 are inputted to the ECU 34 through the input circuit 34a.

A boat speed sensor 120, wind direction/speed sensor 122 and compass 124 are mounted at appropriate locations on the boat 12. The boat speed sensor 120 produces an output or signal representing the boat speed V. The wind direction/speed sensor 122 produces an output or signal representing the direction and strength of the wind acting on the boat 12, and the compass 124 produces an output or signal representing the travel direction (compass direction) θ of the boat 12. The outputs of the boat speed sensor 120, wind direction/speed sensor 122 and compass 124 are also inputted to the ECU 34 through the input circuit 34a. In addition, the outputs of the steering angle sensor 50, throttle position sensor 52 and shift position sensor 54 installed in the outboard motor 10 are also inputted to the ECU 34 through the input circuit 34a.

The microprocessor 34b of the ECU 34 calculates manipulated variables for the steering motor 44, throttle motor 46 and shift motor 48 based on the values inputted through the input circuit 34a and outputs the calculated manipulated variables through the output circuit 34c to the respective motors, thereby controlling their operation.

Figure 5:
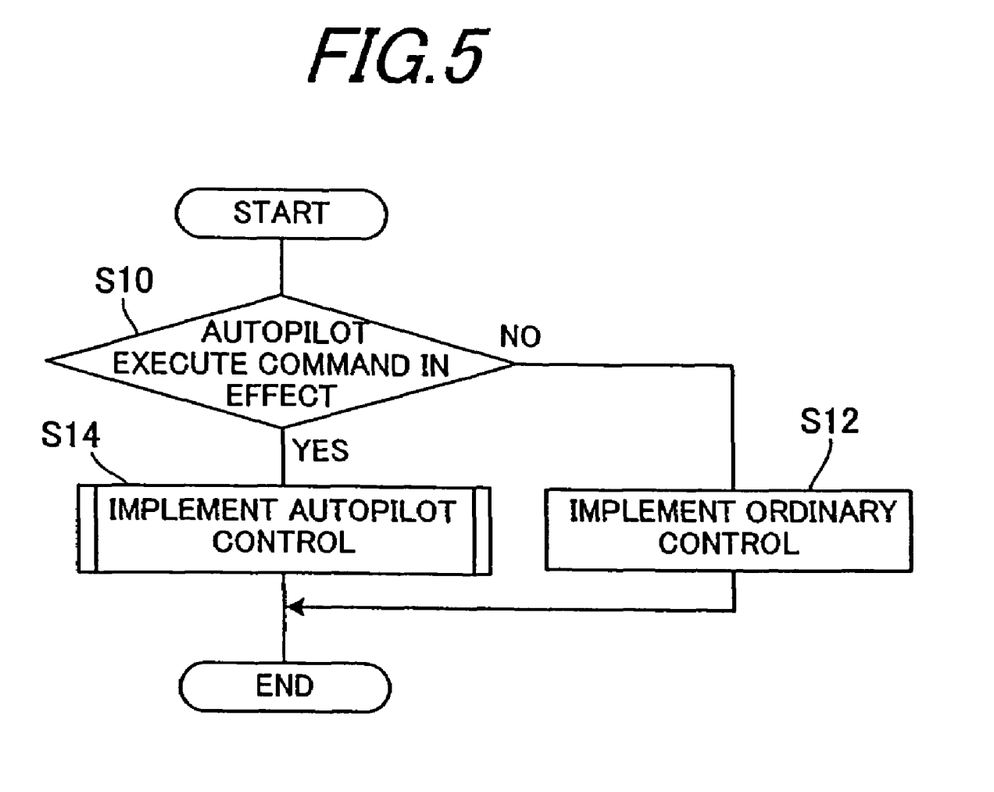
FIG. 5 is a flowchart showing the operation of the system shown in FIG. 4.

FIG. 5 is a flowchart showing the operation of the system illustrated in FIG. 4, more precisely the processing conducted by the ECU 34 illustrated in FIG. 4. The program is executed at prescribed intervals (e.g., every 10 milliseconds).

The processing conducted by the ECU 34 will be briefly explained.

The ECU 34 switches between manual navigation (by the operator) and automatic navigation (autopilot) based on the values inputted through the input circuit 34a. Specifically, the ECU 34 either executes ordinary control in which the operation of the motors is controlled in accordance with operator commands inputted from the steering wheel 16 and shift/throttle lever 22, i.e., the steering commands, shift position change commands and engine speed regulation commands of the outboard motor 10, or executes autopilot control in which the boat 12 is automatically navigated by controlling the operation of the respective electric motors based on information on the position of the boat 12 during navigation inputted from the GPS plotter 26 and the desired position of the boat 12, so as to bring the boat 12 to the desired position.

Thus, the system comprises the steering actuator (electric steering motor 44) for steering the outboard motor to right and left directions relative to the boat, the throttle actuator (electric throttle motor 46) for moving the throttle valve (74) of the engine to regulate the engine speed, the shift actuator (electric shift motor 48) for driving the shift mechanism (96) to change the shift position of the outboard motor, the operation unit (steering wheel 16, shift/throttle lever 22) for allowing the operator to input at least one from among steering command to steering the outboard motor, engine speed regulation command to regulate the engine speed and shift position change command to change the shift position of the outboard motor, and a device (GPS plotter 26) for detecting the actual position of the boat on a traveling course and for allowing the operator to input the desired course position.

Based on the above, explaining the flowchart of FIG. 5, first, in S10, it is determined whether the autopilot execute command is in effect. This determination is made by referring to the output of the autopilot switch 30. When the result in S10 is NO, i.e., when the autopilot switch 30 outputs the autopilot disable command, the program goes to S12, in which ordinary control is implemented.

Specifically, the desired steering angle of the outboard motor 10 is determined in accordance with the steering angle of the steering wheel 16 detected by the steering angle sensor 18 and the operation of the steering motor 44 is controlled to make the steering angle equal to the desired steering angle. Further, the desired shift position is determined based on the output of the lever position sensor 24, more exactly, the direction of shift/throttle lever 22 manipulation and the operation of the shift motor 48 is controlled to establish the desired shift position. Moreover, when it has been discriminated from the output of the shift position sensor 54 that the desired shift position has been established, i.e., shifting is completed, the desired throttle opening is then determined based on the output of the lever position sensor 24, more exactly, the amount of shift/throttle lever 22 manipulation and the operation of the throttle motor 46 is controlled to make the throttle opening equal to the desired throttle opening.

When the result in S10 is YES, i.e., when the autopilot switch 30 outputs the autopilot execute command, the program goes to S14, in which autopilot control is implemented.

Figure 6:
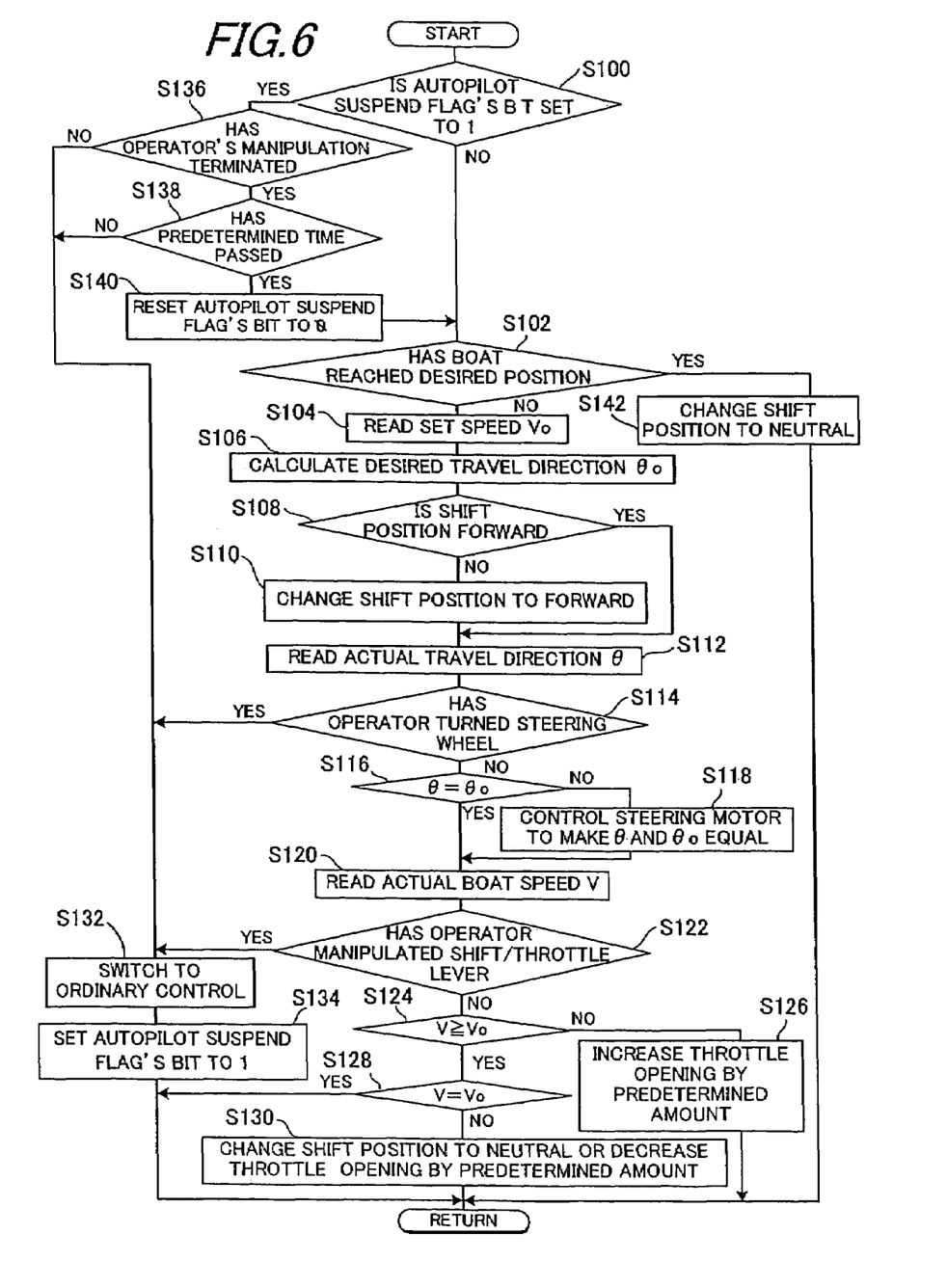
FIG. 6 is a subroutine flowchart showing the processing for autopilot control conducted in the flowchart of FIG. 5.

FIG. 6 is a subroutine flowchart showing the processing for autopilot control.

Explaining this, first, in S100, it is determined whether the bit of an autopilot suspend flag is set to 1 (initial value 0). When the result in S100 is NO, the program goes to S102, in which it is determined whether the boat 12 has reached the desired position. This determination is made by comparing the actual or current position of the boat 12 determined by the GPS plotter 26 and the inputted desired position.

When the result in S102 is NO, the program goes to S104, in which the set speed Vo (output of the boat speed setting switch 32) is read, and to S106, in which the desired travel direction θo is calculated. The desired travel direction θo is determined from the desired course obtained by drawing a straight line between the actual and desired positions of the boat 12. Optionally, the desired travel direction θo can be corrected for the direction and strength of the wind detected by the wind direction/speed sensor 122.

Next, in S108, it is determined whether the shift position is forward. When the result in S108 is NO, the program goes to S110, in which the operation of the shift motor 48 is controlled to change the shift position to forward. When the result in S108 is YES, S100 is skipped.

Next, in S112, the actual or current travel direction θ of the boat 12 (output of the compass 124) is read. Then, in S114, it is determined whether the operator has turned the steering wheel 16. When the result in S114 is NO, the program goes to S116, in which it is determined whether the actual and desired travel directions θ and θo are the same. When the result in S116 is NO, the program goes to S118, in which the operation of the steering motor 44 is controlled to make θ and θo equal (the outboard motor 10 is steered to regulate the travel direction). When the result in S116 is YES, S118 is skipped.

Next, in S120, the actual or current boat speed V (output of the boat speed sensor 120) is read. Then, in S122, it is determined whether the operator has manipulated the shift/throttle lever 22. When the result in S122 is NO, the program goes to S124, in which it is determined whether the actual boat speed V is equal to or higher than the set speed Vo. When the result in S124 is NO, the program goes to S126, in which the throttle opening is increased by a predetermined amount. Specifically, the operation of the throttle motor 46 is controlled to increase the boat speed V by a predetermined amount.

When the result in S124 is YES, the subroutine goes to S128, in which it is determined whether the actual boat speed V is the same as the set speed Vo. When the result in S128 is NO, i.e., when the boat speed V is higher than the set speed Vo, the program goes to S130, in which the shift position is changed to neutral or the throttle opening is decreased by a predetermined amount, thereby lowering the speed of the boat 12. When the result in S128 is YES, S130 is skipped and the actual or current throttle opening and shift position are maintained. Optionally, the subroutine can be configured so that when the boat 12 approaches the desired position the throttle opening or shift position is regulated to lower the speed of the boat 12 irrespective of the set speed Vo.

Thus in autopilot navigation, the boat 12 is automatically navigated by controlling the operation of the individual electric motors based on the information on the position of the boat 12 during navigation inputted from the GPS plotter 26 and the desired position of the boat 12.

When the result in S114 or 122 is YES, i.e. when the operator has turned the steering wheel 16 or manipulated the shift/throttle lever 22, the program goes to S132, in which the control is switched to ordinary control, i.e., autopilot control is suspended and ordinary control is implemented, and then to S134, in which the bit of the autopilot suspend flag is set to 1.

Thus if the steering wheel 16 is turned or the shift/throttle lever 22 is manipulated while autopilot is in effect, i.e., if the operator inputs one or more among the steering command, shift position change command and engine speed regulation command of the outboard motor 10, autopilot is suspended and manual operation is implemented.

Once the bit of the autopilot suspend flag is set to 1, the result in S100 becomes YES and the program goes to S136, in which it is determined whether turning of the steering wheel 16 and/or manipulation of the shift/throttle lever 22 by the operator has terminated. When the result in S136 is YES, the program goes to S138, in which it is determined whether a predetermined time (e.g., several seconds) has passed since turning of the steering wheel 16 and/or manipulation of the shift/throttle lever 22.

When the result in S136 or S138 is NO, the program goes to S132 and ordinary control is continued. When the result in S138 is YES, the program goes to S140, in which the bit of the autopilot suspend flag is reset to 0, whereafter the processing from S102 onward is executed. In other words, when autopilot has been suspended, it is activated again if no operator command is inputted for a predetermined period of time. When the result in S102 is YES, i.e., when the boat 12 has reached the desired position, the program goes to S142, in which the boat 12 is stopped by changing the shift position to neutral.

As explained in the foregoing, the outboard motor control system according to this embodiment of the present invention integrates the outboard motor and the autopilot system, unlike in the conventional outboard motor control system in which the two are separate. Specifically, the embodiment is configured so that the ECU 34 executes ordinary navigation in which the operation of at least one among the steering motor 44, throttle motor 46 and shift motor 48 is controlled in accordance with an operator command inputted from the steering wheel 16 or shift/throttle lever 22 (the steering command, shift position change command or engine speed regulation command of the outboard motor 10) and executes autopilot navigation in which the boat 12 is automatically navigated by controlling the operation of the individual electric motors 44, 46, 48 based on boat position information inputted from the GPS plotter 26 and the desired position of the boat 12.

As a result, the means required for conducting both manual navigation (ordinary control) and automatic navigation (autopilot control) is simplified. In other words, a common control unit is made to serve as both the control unit required for conducting manual navigation and the control unit required for conducting automatic navigation of the controlled object, so that the configuration of the overall system can be simplified, thereby avoiding system enlargement and complication of installation. In addition, the embodiment is configured so that during autopilot navigation the operation of the throttle motor 46 and shift motor 48 is controlled in addition to that of the steering motor 44, thereby enabling boat speed regulation and boat stopping during autopilot navigation.

Moreover, the embodiment is configured so that when an operator command is inputted during autopilot navigation, the autopilot navigation is suspended and the operation of at least one among the steering motor 44, throttle motor 46 and shift motor 48 is controlled (in other words, ordinary control is implemented). As a result, switching from autopilot navigation to manual navigation can be achieved promptly and without need for the operator to take any action (namely, operate the autopilot switch 30), so that the burden on the operator is minimized.

Further, the embodiment is configured to restore autopilot navigation if no operator command is inputted for a predetermined period of time. Switching from manual operation to autopilot operation can therefore also be achieved without need for the operator to take any action (namely, operate the autopilot switch 30), so that the burden on the operator is minimized.

The embodiment is thus configured to have a system for controlling operation of an outboard motor (10) mounted on a stem of a boat (12) and having an internal combustion engine (36), comprising: a steering actuator (electric steering motor 44) for steering the outboard motor to right and left directions relative to the boat; a throttle actuator (electric throttle motor 46) for moving a throttle valve (74) of the engine to regulate an engine speed; a shift actuator (electric shift motor 48) for driving a shift mechanism (96) to change a shift position of the outboard motor, an operation unit (steering wheel 16, shift/throttle lever 22) for allowing an operator to input at least one from among steering command to steer the outboard motor, engine speed regulation command to regulate the engine speed and shift position change command to change the shift position of the outboard motor; a device (GPS plotter 26) for detecting an actual position of the boat on a traveling course and for allowing the operator to input a desired course position; and a controller (ECU 34; S14, S100 to S140) executing an autopilot navigation by controlling operation of at least one of the steering actuator, the throttle actuator and the shift actuator based on the detected actual position of the boat and the inputted desired course position, such that the boat is automatically navigated.

In the system, the controller suspends the autopilot navigation, if the command is inputted by the operator when the autopilot navigation is in progress (S114, S122, S132).

In the system, the controller restores the autopilot navigation if a predetermined period of time has passed since the input of the operator command (S100, S136 to S140).

In the system, the operation unit comprises at least one of a steering wheel (16) to input the steering command and a shift/throttle lever (22) to input the engine speed regulation command and the shift position change command.

In the system, the device comprises a GPS plotter (26) having a receiver for receiving radio wave transmitted from a satellite, a display indicating a wake of the boat and switches to input the desired course position.

It should be noted in the above that, although the foregoing embodiment is explained with reference to a boat equipped with a single outboard motor, this is not a limitation and the outboard motor 10 can be equipped with two or more motors.

It should also be noted that, although the electric motors are exemplified for use as the steering actuator, throttle actuator and shift actuator in the foregoing description, it is possible instead to utilize hydraulic cylinders or any of various other kinds of actuators.

Japanese Patent Application No. 2005-114863 filed on Apr. 12, 2005 is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling operation of an outboard motor mounted on a stern of a boat and having an internal combustion engine, comprising:
    a steering actuator for steering the outboard motor to right and left directions relative to the boat;
    a throttle actuator for moving a throttle valve of the engine to regulate an engine speed;
    a shift actuator for driving a shift mechanism to change a shift position of the outboard motor;
    an operation unit for allowing an operator to input an operator command from at least among a steering command to steer the outboard motor, an engine speed regulation command to regulate the engine speed, and a shift position change command to change the shift position of the outboard motor;
    a device for detecting an actual position of the boat on a traveling course and for allowing the operator to input a desired course position;
    a controller for executing an autopilot navigation by controlling operation of the steering actuator, the throttle actuator and the shift actuator based on the detected actual position of the boat and the inputted desired course position, such that the boat is automatically navigated; wherein the controller suspends the autopilot navigation, if the engine speed regulation command is inputted by the operator when the autopilot navigation is in progress.

2. The system according to claim 1, wherein the controller restores the autopilot navigation if a predetermined period of time has passed since the input of the engine speed regulation command.

3. The system according to claim 1, wherein the operation unit comprises a shift/throttle lever to input the engine speed regulation command and the shift position change command.

4. The system according to claim 1, wherein the device comprises a GPS plotter having a receiver for receiving radio wave transmitted from a satellite, a display indicating a wake of the boat and switches to input the desired course position.

5. The system according to claim 1, wherein the controller includes a single electronic control unit.

6. The system according to claim 1, wherein the operation unit comprises a steering wheel to input the steering command and a shift/throttle lever to input the engine speed regulation command and the shift position change command.

* * * * *